United States Patent [19]
Haskell et al.

[11] 3,767,847
[45] Oct. 23, 1973

[54] FRAME-TO-FRAME REDUNDANCY REDUCTION SYSTEM WHICH TRANSMITS AN INTRAFRAME CODED SIGNAL

[75] Inventors: Barin Geoffry Haskell; John Ormond Limb, both of New Shrewsbury; Roger Fabian Wedgwood Pease, Holmdel, all of N.J.

[73] Assignee: Bell Telephone Laboratories, Incorporated, Murray Hill, N.J.

[22] Filed: July 1, 1971

[21] Appl. No.: 158,812

[52] U.S. Cl. ............... 178/6, 178/DIG. 3, 325/38 B
[51] Int. Cl. ............... H04n 7/12
[58] Field of Search ............... 178/6, DIG. 3; 179/15 BW, 15.55 R; 325/38 B

[56] References Cited

UNITED STATES PATENTS

| | | | |
|---|---|---|---|
| 3,571,505 | 3/1971 | Mounts | 178/7.2 |
| 3,603,725 | 9/1971 | Cutler | 178/DIG. 3 |

*Primary Examiner*—Robert L. Griffin
*Assistant Examiner*—Joseph A. Orsino, Jr.
*Attorney*—W. L. Keefauver et al.

[57] ABSTRACT

The element-to-element differences for an entire video frame of picture elements are stored in a frame memory. These stored differences are converted to picture element amplitudes by a decoder. Normally, the amplitude value from the decoder is reconverted into an element-to-element difference by an intraframe coder and coupled back into the frame memory. However, each amplitude value developed by the decoder is also compared with the new amplitude of its corresponding picture element. When a significant difference exists between the amplitude value at the output of the decoder and the new amplitude value, the latter value is coupled to the input of the coder in place of the amplitude value from the decoder. The resulting element-to-element difference is transmitted to a receiving location. In the receiver, element-to-element differences are stored in a frame memory and circulated in a loop including a decoder and intraframe coder similar to that found in the transmitter. In addition, the element-to-element differences out of the receiver's coder are coupled into a second decoder. When an element-to-element difference for a picture element is received, it is coupled to the input of the second decoder in place of the element-to-element difference from the intraframe coder, and the output of the second decoder is coupled to the input of the intraframe coder in place of the output from the first-mentioned decoder.

12 Claims, 10 Drawing Figures

INVENTORS B. G. HASKELL
J. O. LIMB
R. F. W. PEASE
BY Daniel D. Dubosky
ATTORNEY

FIG. 6
ELEMENT-TO-ELEMENT DIFFERENCE
-9 -4 -1 0 +1 +4 +9
| | | | | | | | | |
|---|---|---|---|---|---|---|---|---|
| 0 | 0 | 0 | 0 | 1 | 1 | 1 | S | CLASSIFIER OUTPUTS |
| 1 | 0 | 0 | 0 | 0 | 0 | 1 | A | |
| 1 | 1 | 0 | 0 | 0 | 1 | 1 | B | |
| 1 | 1 | 1 | 0 | 1 | 1 | 1 | C | |
| -12 | -6 | -2 | 0 | +2 | +6 | +12 | = | WEIGHTER OUTPUTS |
| 011 | 010 | 001 | 000 | 100 | 101 | 110 | = | 3 BIT CONV. OUTPUT |
FIG. 7
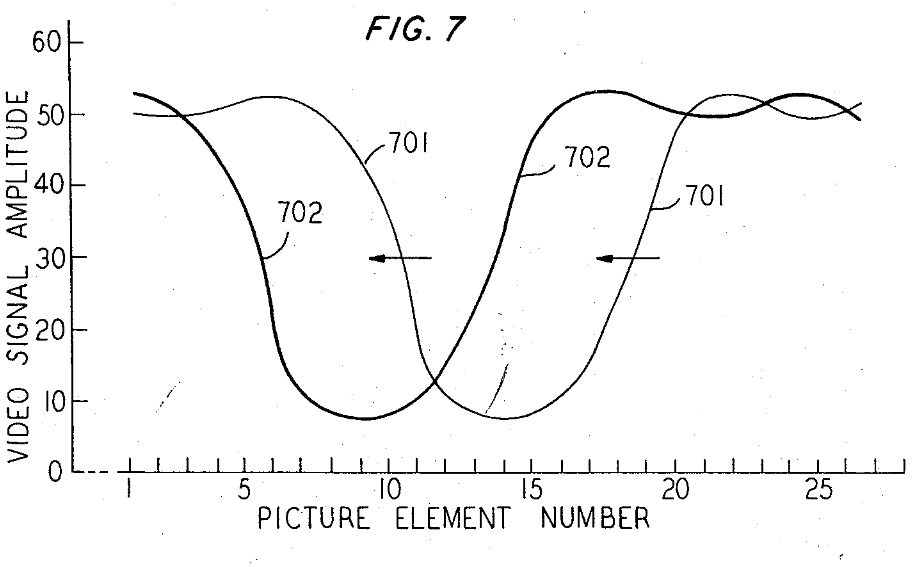
FIG. 8
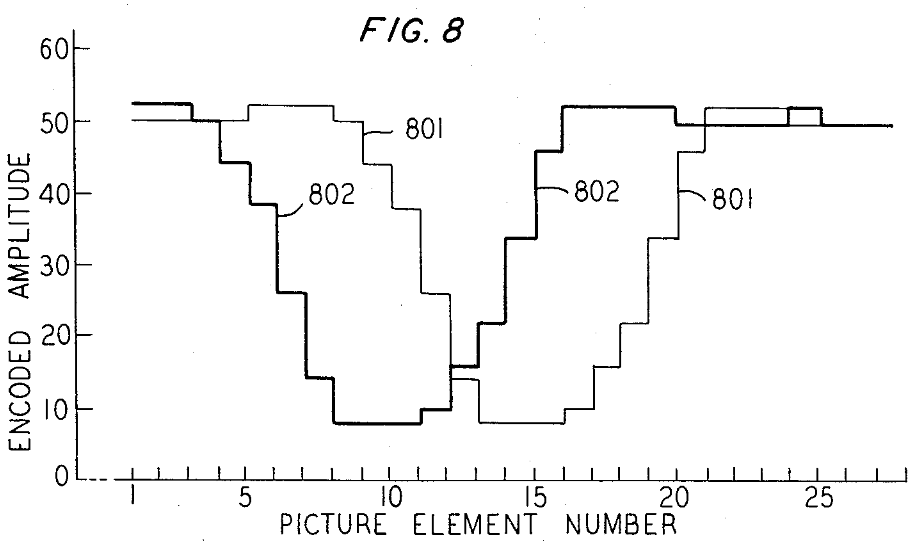

FIG. 9

TRANSMITTER OPERATION
THRESHOLD LEVEL=5

| PICTURE ELEMENT NUMBER | FRAME MEMORY 115 OUTPUT | DECODER 110 OUTPUT | THRESHOLD DETECTOR 107 OUTPUT | ENCODER 101 OUTPUT | INTRAFRAME CODER 114 OUTPUT | ACCUMULATOR 503 OUTPUT | TRANSMITTED VALUE |
|---|---|---|---|---|---|---|---|
| 1 | | 50 | 0 | 52 | | 50 | - |
| 2 | 0 | 50 | 0 | 52 | 0 | 50 | - |
| 3 | 0 | 50 | 0 | 50 | 0 | 50 | - |
| 4 | 0 | 50 | 1 | 44 | -6 | 44 | -6 |
| 5 | +2 | 52 | 1 | 38 | -6 | 38 | -6 |
| 6 | 0 | 52 | 1 | 26 | -12 | 26 | -12 |
| 7 | 0 | 52 | 1 | 14 | -12 | 14 | -12 |
| 8 | -2 | 50 | 1 | 8 | -6 | 8 | -6 |
| 9 | -6 | 44 | 1 | 8 | 0 | 8 | 0 |
| 10 | -6 | 38 | 1 | 8 | 0 | 8 | 0 |
| 11 | -12 | 26 | 1 | 10 | +2 | 10 | +2 |
| 12 | -12 | 14 | 0 | 16 | +6 | 16 | - |
| 13 | -6 | 8 | 1 | 22 | +6 | 22 | +6 |
| 14 | 0 | 8 | 1 | 34 | +12 | 34 | +12 |
| 15 | 0 | 8 | 1 | 46 | +12 | 46 | +12 |
| 16 | +2 | 10 | 1 | 52 | +6 | 52 | +6 |
| 17 | +6 | 16 | 1 | 52 | 0 | 52 | 0 |
| 18 | +6 | 22 | 1 | 52 | 0 | 52 | 0 |
| 19 | +12 | 34 | 1 | 52 | 0 | 52 | 0 |
| 20 | +12 | 46 | 0 | 50 | -6 | 46 | - |
| 21 | +6 | 52 | 0 | 50 | +6 | 52 | - |
| 22 | 0 | 52 | 0 | 50 | 0 | 52 | - |
| 23 | 0 | 52 | 0 | 50 | 0 | 52 | - |
| 24 | -2 | 50 | 0 | 52 | -2 | 50 | - |
| 25 | 0 | 50 | 0 | 50 | 0 | 50 | - |
| 26 | 0 | 50 | 0 | 50 | 0 | 50 | - |

FIG. 10

RECEIVER OPERATION

| PICTURE ELEMENT NUMBER | RECEIVED VALUES | FRAME MEMORY 221 OUTPUT | DECODER 226 OUTPUT | INPUT TO DECODER 217 | DECODER 217 OUTPUT | CODER 220 INPUT | CODER 220 OUTPUT |
|---|---|---|---|---|---|---|---|
| 1 | - | | 50 | 0 | 50 | 50 | 0 |
| 2 | - | 0 | 50 | 0 | 50 | 50 | 0 |
| 3 | - | 0 | 50 | 0 | 50 | 50 | 0 |
| 4 | -6 | 0 | 50 | -6 | 44 | 44 | -6 |
| 5 | -6 | +2 | 52 | -6 | 38 | 38 | -6 |
| 6 | -12 | 0 | 52 | -12 | 26 | 26 | -12 |
| 7 | -12 | 0 | 52 | -12 | 14 | 14 | -12 |
| 8 | -6 | -2 | 50 | -6 | 8 | 8 | -6 |
| 9 | 0 | -6 | 44 | 0 | 8 | 8 | 0 |
| 10 | 0 | -6 | 38 | 0 | 8 | 8 | 0 |
| 11 | +2 | -12 | 26 | +2 | 10 | 10 | +2 |
| 12 | - | -12 | 14 | +6 | 16 | 14 | +6 |
| 13 | +6 | -6 | 8 | +6 | 22 | 22 | +6 |
| 14 | +12 | 0 | 8 | +12 | 34 | 34 | +12 |
| 15 | +12 | 0 | 8 | +12 | 46 | 46 | +12 |
| 16 | +6 | +2 | 10 | +6 | 52 | 52 | +6 |
| 17 | 0 | +6 | 16 | 0 | 52 | 52 | 0 |
| 18 | 0 | +6 | 22 | 0 | 52 | 52 | 0 |
| 19 | 0 | +12 | 34 | 0 | 52 | 52 | 0 |
| 20 | - | +12 | 46 | -6 | 46 | 46 | -6 |
| 21 | - | +6 | 52 | +6 | 52 | 52 | +6 |
| 22 | - | 0 | 52 | 0 | 52 | 52 | 0 |
| 23 | - | 0 | 52 | 0 | 52 | 52 | 0 |
| 24 | - | -2 | 50 | -2 | 50 | 50 | -2 |
| 25 | - | 0 | 50 | 0 | 50 | 50 | 0 |
| 26 | - | 0 | 50 | 0 | 50 | 50 | 0 |

FRAME-TO-FRAME REDUNDANCY REDUCTION SYSTEM WHICH TRANSMITS AN INTRAFRAME CODED SIGNAL

BACKGROUND OF THE INVENTION

This invention relates to redundancy reduction systems and, more particularly, to redundancy reduction systems for use with video signals.

In U.S. Pat. No. 3,571,505 of Mar. 16, 1971 to F. W. Mounts, a redundancy reduction system is described in which an entire frame of picture element amplitudes is stored in a frame memory and each new picture element amplitude is transmitted to the receiving location only if it differs significantly from its corresponding previously stored amplitude. In this system, the value which is stored for each picture element corresponds to the full amplitude value of the video signal for a spatial point within the video frame. In accordance with the invention of the Mounts patent, the number of bits which must be used for addressing the transmitted amplitudes is significantly reduced by forcibly transmitting the amplitude information for a predetermined spatial point location in each video line. As a result, line synchronization is maintained with the receiver, and each address word need only position a transmitted element within the video line.

To reduce the number of bits which must be stored in the frame memory of a redundancy reduction system of the type disclosed in the above-identified Mounts patent, E. F. Brown in a copending application filed on June 13, 1969, Ser. No. 833,129, now U.S. Pat. No. 3,582,546 discloses the embodiment of an invention in which indicator words for sets of amplitude values are stored in the frame memory. As each new set of amplitude values is presented to the input of the apparatus, a new indicator word is derived and compared with the previously stored indicator word corresponding to the same set of spatial points within the video frame. If the two indicator words differ, one or more of the amplitude values within the set are assumed to have changed and the entire set of amplitude values is transmitted to the receiving location. Although this invention results in a lower requirement for the frame memory storage capacity, amplitude words representing the true amplitude value are still required to be transmitted when a difference is detected.

SUMMARY OF THE INVENTION

It is a primary object of the present invention to reduce the number of bits which must be transmitted in a redundancy reduction system for the purpose of indicating the amplitude changes that have occurred in the picture.

It is another object of the present invention to store fewer bits in the frame memory than are required by the frame memory in the above-identified F. W. Mounts patent.

In accordance with the present invention, element-to-element differences for an entire frame of picture elements are stored in a frame memory. These differences are decoded into absolute amplitude values for the picture elements. Each new picture element amplitude is compared with its corresponding amplitude at the output of the decoder. When the two amplitudes are not significantly different, the amplitude value from the output of the decoder is coupled through to an intraframe coder whose output provides an element-to-element difference to the input of the frame memory. If a significant difference is detected between the new picture element amplitude and the generated amplitude at the output of the decoder, the new amplitude is coupled to the input of the intraframe coder and the resulting element-to-element difference is transmitted to the receiving location in addition to being coupled to the input of the frame memory.

In the receiver, a frame memory provides element-to-element differences to the input of a first decoder, which in turn provides amplitude values at its output for each of the picture elements within a video frame. These amplitude values are normally coupled to a digital-to-analog converter which provides an analog video signal at its output. In addition, the amplitude values are coupled to the input of an intraframe coder which provides element-to-element differences back to the input of the frame memory. The element-to-element differences from the intraframe coder are also normally connected to the input of a second decoder whose output amplitude values are normally not utilized. When an element-to-element difference is received from the transmitter, this element-to-element difference is coupled to the input of the second decoder in place of the element-to-element difference from the output of the intraframe coder. The resulting picture element amplitude at the output of the second decoder is coupled to the input of the intraframe coder and to the digital-to-analog converter in place of the amplitude value available at the output of the first decoder.

BRIEF DESCRIPTION OF THE DRAWINGS

The invention will be more readily understood after reading the following detailed description in conjunction with the drawings, in which:

FIGS. 6, 7, 8, 9 and 10 are charts and waveforms useful in describing the operation of the present invention.

DETAILED DESCRIPTION

Figure 1:
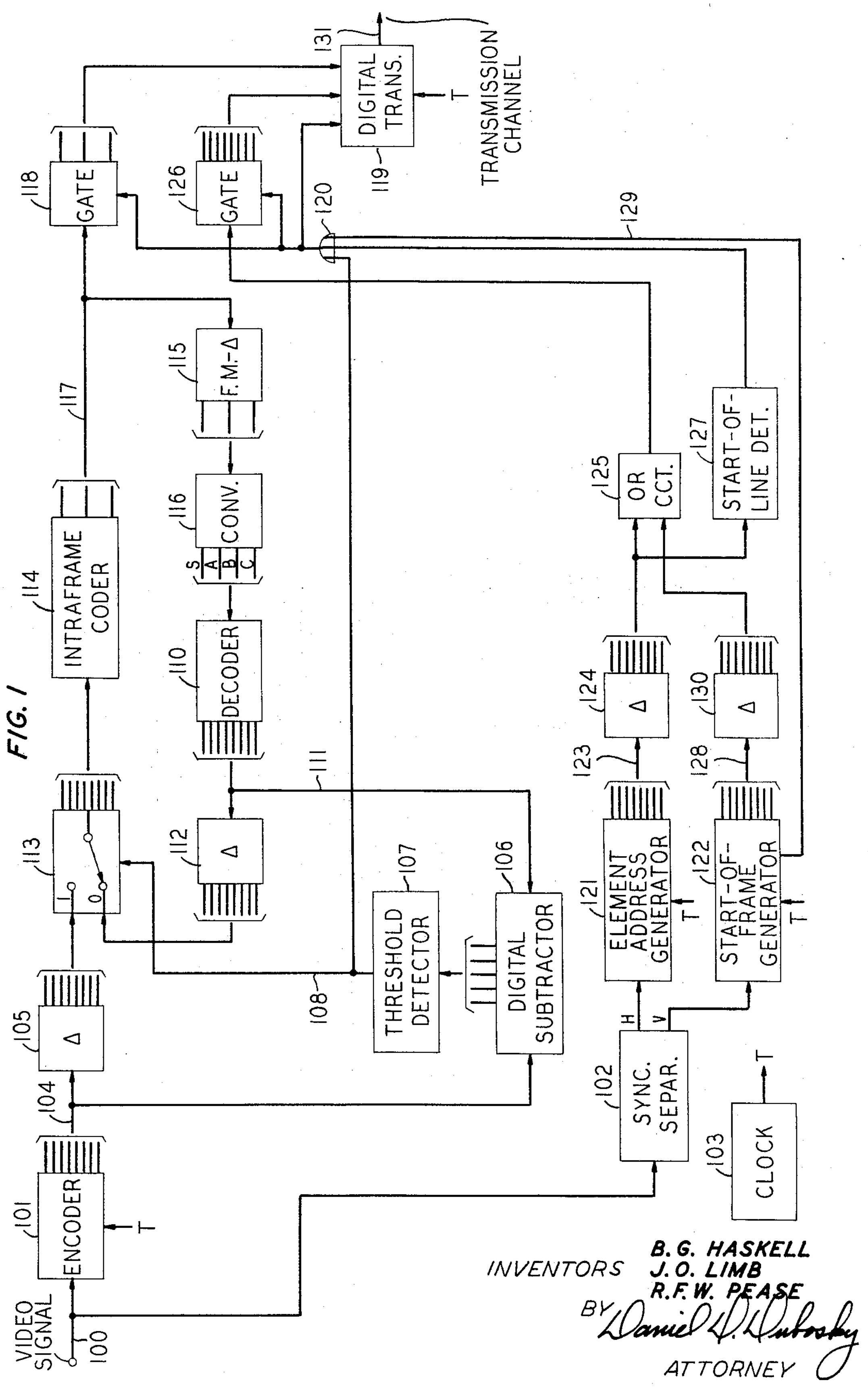
FIG. 1 is a schematic block diagram of a transmitting apparatus constructed in accordance with the present invention.

In FIGS. 1, an analog video signal having a standard format of video lines separated by horizontal and vertical blanking intervals is presented on line 100. In the embodiment described herein in connection with FIGS. 1 and 2, the video signal is of the noninterlaced or line sequential type, that is, adjacent video lines are scanned in sequence. As will be obvious to those skilled in the art, however, the invention is equally applicable to the commercial type of video signal wherein the frame interval is divided into field intervals and the lines of each field interval are interlaced. This video signal is coupled by way of line 100 to the input of an encoder 101 and to a sync separator 102. In response to each energizing pulse from the output of a clock circuit 103, encoder 101 provides an 8-bit digital word on bus 104 which represents by its value the amplitude of the video signal during the instant of sampling. As will be readily apparent to those skilled in the art after a more thorough understanding of the present invention, the only important criteria to the present invention is that video signal samples be provided on bus 104 representing all of the spatial point locations or picture elements within the video frame. Accordingly, video signals in other than the analog form may be provided at the input of the apparatus. These signals may even take the form of previously encoded digital signals of the type wherein the digital words represent element-to-element differences. In the latter case, a decoding apparatus may replace encoder 101 in order to provide digital words on bus 101 whose values represent absolute amplitude values of the picture elements within the video frame.

Each digital word on bus 104 is coupled to one input of a digital subtractor circuit 106. The other input of digital subtractor circuit 106 is provided with a digital word from the output of a decoder 110. As will be apparent hereinafter, the digital word at the output of decoder 110 on bus 111 represents by its value the amplitude of the same picture element or spatial point whose amplitude is presently represented by the digital word on bus 104. The digital word on bus 111, however, represents the amplitude for that picture element during some previous video frame interval. The output of digital subtractor circuit 106 couples a difference digital word to the input of a threshold detector 107. If the magnitude of the difference digital word exceeds the threshold value within detector 107, an energizing signal is produced on line 108; otherwise, line 108 remains unenergized. Hence, if no significant change occurs in the amplitude of the spatial point represented by the digital words on buses 104 and 111, no energizing signal is produced on line 108. If, however, a change in amplitude occurs at that spatial point between the two frame intervals represented by the two digital words on buses 104 and 111 such that the change exceeds the threshold value of detector 107, an energizing signal is produced on line 108.

The digital word on bus 104 is delayed by a delay element 105 before being coupled to one input of a transmission gate 113. The digital word on bus 111 is delayed by an identical amount in delay element 112 before it is coupled to a second input of transmission gate 113. Gate 113 is controlled by the energizing signal on line 108. With no energizing signal on line 108, the digital word from delay element 112 is coupled through gate 113 to the input of an intraframe coder 114. If, however, an energizing signal is generated on line 108, transmission gate 113 is operated and the digital word from delay element 105 is coupled through to the input of intraframe coder 114. The delay provided by elements 105 and 112 need only be long enough in duration to permit the digital subtractor circuit 106 and threshold detector circuit 107 to make the determination as to whether or not a significant change in the value of the picture element has occurred. Although transmission gate 113 is shown as a single-pole double-throw switch, it is actually constructed of a plurality of AND gates and OR gates, the AND gates being under the control of the energizing signal on line 108.

Figure 5:
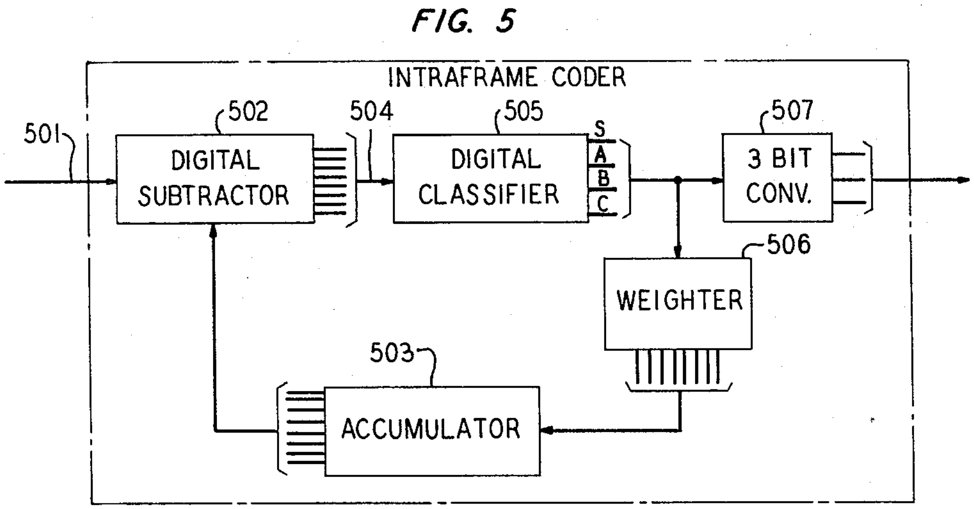

Each digital word coupled to the input of intraframe coder 114 is caused to produce an encoded digital word on bus 117. In the present embodiment, intraframe coder 114 is an element-to-element encoder which provides digital words on bus 117 representing the differences between successive picture elements. Accordingly, the digital words on bus 117 are referred to hereinafter as element-to-element difference words. As pointed out hereinafter in connection with FIG. 5, intraframe coder 114 actually develops the difference between the input digital word and a quantized value which represents the amplitude of the previous picture element. It is this difference which is referred to hereinafter as an element-to-element difference. It is to be understood, however, that the invention is in no way limited to the simple type of element-to-element encoder disclosed herein. As will be readily appreciated by those skilled in the art, other more complicated encoders which rely on the information from more than two picture elements in producing their output signals may be utilized equally as well in practicing the present invention.

Each element-to-element difference word on bus 117 is coupled to the input of a frame memory 115. In the present embodiment, frame memory 115 is constructed of an ultrasonic delay line which causes each element-to-element difference word to be delayed by an amount substantially equal to one video frame interval. It is less than a video frame interval by the amount of delay introduced by element 112. As a result, the digital words appearing at the output of decoder 110 are present at the input of transmission gate 113 one video frame interval after they have been presented to the input of an intraframe coder 114. Each element-to-element difference word at the output of frame memory 115 is coupled by way of converter 116 to the input of decoder 110. Converter 116 simply transforms the 3-bit digital word at the output of frame memory 115 into a form which is more compatible with the decoder to be described hereinafter in connection with FIG. 4.

When a significant change in the picture element under consideration has occurred, the resulting energizing signal on line 108 not only causes the digital word from element 105 to replace the digital word from element 112 but also causes the resulting element-to-element difference word on bus 117 to be coupled through a transmission gate 118 to the input of a digital transmitter 119. This result is achieved by coupling the energizing signal on line 108 through an OR gate 120 to the control input of transmission gate 118. Here again, the transmission gate is actually constructed of a plurality of AND gates under the control of the energizing signal out of OR gate 120.

In summary, the transmitting apparatus in FIG. 1 stores an entire frame of element-to-element difference signals within frame memory 115. These element-to-element difference signals are normally recirculated within the loop provided by decoder 110, delay element 112, transmission gate 113, intraframe coder 114, frame memory 115, and converter 116. If, however, a change or movement has been determined to have occurred within the picture, the digital words from bus 104 representing the new picture element amplitudes are coupled to the input of intraframe coder 114 and the resulting element-to-element difference words are coupled through gate 118 by way of digital transmitter 119 to the receiving location.

Even when movement does occur within a picture, that movement almost never results in changing the values for all of the picture elements within the video frame. Accordingly, the element-to-element difference signals which are selected for transmission are selected at a relatively random rate. Therefore, some means of addressing must be provided with each of these element-to-element difference words in order to permit a receiving apparatus to properly locate them within the video frame. To achieve the addressing, sync separator 102 extracts the horizontal and vertical synchronization information from the analog signal on line 100 and provides this information to an element address generator 121 and a start-of-frame generator 122. In response to each energizing pulse out of clock circuit 103, element address generator 121 provides a digital word on bus 123 which represents by its value the position of its corresponding amplitude digital word on bus 104 within the video line. Each address digital word on bus 123 is coupled through a delay element 124 to the input of an OR circuit 125. Delay element 124 introduces a delay substantially identical to the delay of element 105. Accordingly, an address digital word is available at the output of OR circuit 125 at substantially the same instant at which its corresponding element-to-element difference word is presented on bus 117.

Each energizing signal coupled by way of gate 120 to the control input of gate 118 is also coupled to the control input of a transmission gate 126. In response to this energizing signal, transmission gate 126 couples the address digital word from the output of OR circuit 125 to another input of digital transmitter 119. Hence, each element-to-element difference word coupled to digital transmitter 119 is accompanied by an address digital word which will permit the receiver to properly place the element-to-element difference word within the video line.

When the address word corresponding to the first picture element in a video line is coupled to the input of OR circuit 125, a start-of-line detector 127 responds to this address by developing an energizing signal at a second input of OR gate 120. As a result, the first picture element in each video line is forcibly transmitted to the receiving location even though the corresponding picture element amplitude may not represent a significant change. In this way, the receiving apparatus can maintain line synchronization with the transmitting apparatus and the address words need only position an element-to-element difference word within the video line.

During the end of each vertical blanking interval, a start-of-frame generator 122 produces a digital word on bus 128 which is distinguishable from all address words provided on bus 123. The digital word on bus 128 is delayed by element 130 and coupled by way of OR circuit 125 to the input of transmission gate 126. Simultaneously therewith, start-of-frame generator 122 provides an energizing signal by way of line 129 to a third input of OR gate 120. As a result, this distinguishable digital word from the start-of-frame generator 122 is caused to be transmitted at the end of each vertical blanking interval and the receiving apparatus can utilize this word in order to establish frame synchronization in the event that an error should occur in the above-mentioned line-to-line synchronization. Digital transmitter 119 accepts the digital bits provided at its inputs by gates 118 and 126 in response to each energizing signal presented at the output of OR gate 120 and stores these digitally in a buffer memory (not shown) within the digital transmitter. These digital bits are then coupled by digital transmitter 119 by way of a transmission channel 131 to the receiving apparatus in FIG. 2 in a manner well known to those skilled in the digital transmission art.

Upon receiving the digital information on transmission channel 131, digital receiver 200, in a manner well known to those skilled in the digital transmission art, separates the digital bits into an element-to-element difference word for presentation on bus 201 and an address digital word for presentation on bus 202. Timing information from the digital bit stream on transmission channel 131 is also coupled by way of receiver 200 and line 230 to a clock generator 231. Since clock generator 102 in FIG. 1 determines the bit rate on transmission channel 131, the timing pulses developed by clock generator 231 in FIG. 2 can be made and are made to occur at a rate identical to the rate of the timing pulses out of generator 103 in FIG. 1. In response to this timing information on line 230, synchronization generator 204 provides horizontal and vertical synchronization signals on lines 205 and 206 respectively. The horizontal synchronization information is coupled by way of line 205 to the reset input of an element address generator 207 which responds to the timing pulses on line 203 out of clock generator 231 and provides at its output on bus 210 address digital words with a frequency substantially identical to the address words provided by generator 121 in FIG. 1. At the end of each horizontal blanking interval, generator 121 is reset to zero. The vertical synchronization signal on line 206 is coupled to the input of a start-of-frame generator 208. At the termination of each vertical blanking interval, start-of-frame generator 208 provides a digital word on bus 209 identical to the digital word provided by generator 122 in FIG. 1. The address digital words from generator 207 on bus 210 and the distinguishable digital word on bus 209 are coupled by way of OR circuit 211 to one input of a comparator circuit 212. A second input of comparator circuit 212 is connected to receive the address digital word on bus 202. When the digital word on bus 202 is identical to the digital word provided by OR circuit 211, comparator circuit 212 develops an energizing signal on line 213.

Line 213 is connected to the control input of a transmission gate 214 and also to the control input of a transmission gate 215. Here again, as in the case of transmission gate 113 in FIG. 1, the transmission gates 214 and 215 are shown symbolically as single-pole double-throw switches but they are actually constructed of a plurality of OR gates and AND gates, the AND gates being under the control of the energizing signal on line 213. With no energizing signal present at its control input, each of the transmission gates 214 and 215 connects the digital word on the bus connected to its logical "0" input through to its output terminal. When an energizing signal is present on line 213, however, each one of the transmission gates operates so as to connect the digital word present on the bus connected to its logical "1" input through to its output terminal.

In response to the energizing signal on line 213, the element-to-element difference word on bus 201 is coupled through gate 214 to the input of a converter circuit 216. Converter 216 merely converts the 3-bit digital word at its input into a form which is more compatible with the decoder apparatus to be described hereinafter in connection with FIG. 4. The output of converter 216 is connected to the input of a decoder 217 which responds to the element-to-element difference word by adding that difference in an algebraic sense to a previously stored amplitude value and thereby generates an 8-bit digital word at its output on bus 218 in a fashion identical to that of decoder 110 in FIG. 1. This 8-bit digital word represents the amplitude of a picture element within the video frame. With an energizing signal present on line 213, the 8-bit digital word on bus 218 is coupled through gate 215 to the input of a digital-to-analog converter 219 and also to the input of an intraframe coder 220.

Digital-to-analog converter 219 transforms the 8-bit digital word into an analog value and couples this value to one input of a mixer circuit 221. A second input of mixer circuit 221 is connected to sync generator 204 by way of line 222 which provides a combination signal containing both vertical and horizontal synchronization information. This composite synchronizing signal is mixed with the analog information from converter 219 in mixer circuit 221 in order to provide a video signal of the standard type having vertical and horizontal blanking intervals on line 223.

Intraframe coder 220 is identical to the intraframe coder 114 in FIG. 1. Coder 220 responds to each of the 8-bit digital words presented at its input by providing a 3-bit digital word at its output, representing the element-to-element difference in a fashion identical to intraframe coder 114 in FIG. 1. The element-to-element difference word out of coder 220 is coupled both to the input of a frame memory 221 and also to the logical "0" input of transmission gate 214. During the interval, when an energizing signal is present on line 213, gate 214 is coupled to the logical "1" input and therefore the element-to-element difference word provided at the logical "0" input proceeds only into the frame memory 221.

After an interval equal to one complete video frame time, the element-to-element difference word presented at the input of frame memory 221 energizes at its output on bus 224. Each element-to-element difference word on bus 224 is converted by converter circuit 225 into a format more compatible with decoder circuit 226. Decoder circuit 226 is identical to decoder 217 and decoder circuit 110 in FIG. 1. It responds to each of the 3-bit element-to-element difference words on bus 224 and provides an 8-bit digital word on bus 227 at its output. Hence, one video frame time after an element-to-element difference word is coupled into frame memory 221, the corresponding 8-bit amplitude digital word is available on bus 227 at the logical "0" input of gate 215. If at this time an energizing signal is not present on line 213, the 8-bit digital word on bus 227 is coupled through gate 215 to the inputs of both digital-to-analog converter 219 and intraframe coder 220. With no energizing signal on line 213, the resulting 3-bit element-to-element difference word from the output of coder 220 is coupled into frame memory 221 and through gate 214 and converter 216 to the input of decoder 217. In this way, the element-to-element difference words stored within frame memory 221 continue to circulate within the loop provided by way of intraframe coder 220, frame memory 221, converter 225, decoder 226, and gate 215 until such time as an energizing signal is presented on line 213. At that time, the new element-to-element difference word on bus 201 is caused to develop the next 8-bit digital word out of decoder 217, and the resulting 8-bit digital word on bus 218 is coupled to converter 219 and coder 220 through the action of gate 215.

In addition to causing a change in the element-to-element difference words stored within frame memory 221, the energizing signal on line 213 also causes digital receiver 200 to replace the digital words provided at its output on buses 201 and 202 with the next element-to-element difference word and address word stored in a buffer memory within digital receiver 200. The timing of these operations within digital receiver 200 should, of course, be delayed for a sufficient duration of time such that the element-to-element difference word on bus 201 is permitted to be coupled through gate 214 before it is replaced by the next element-to-element difference word.

Figure 2:
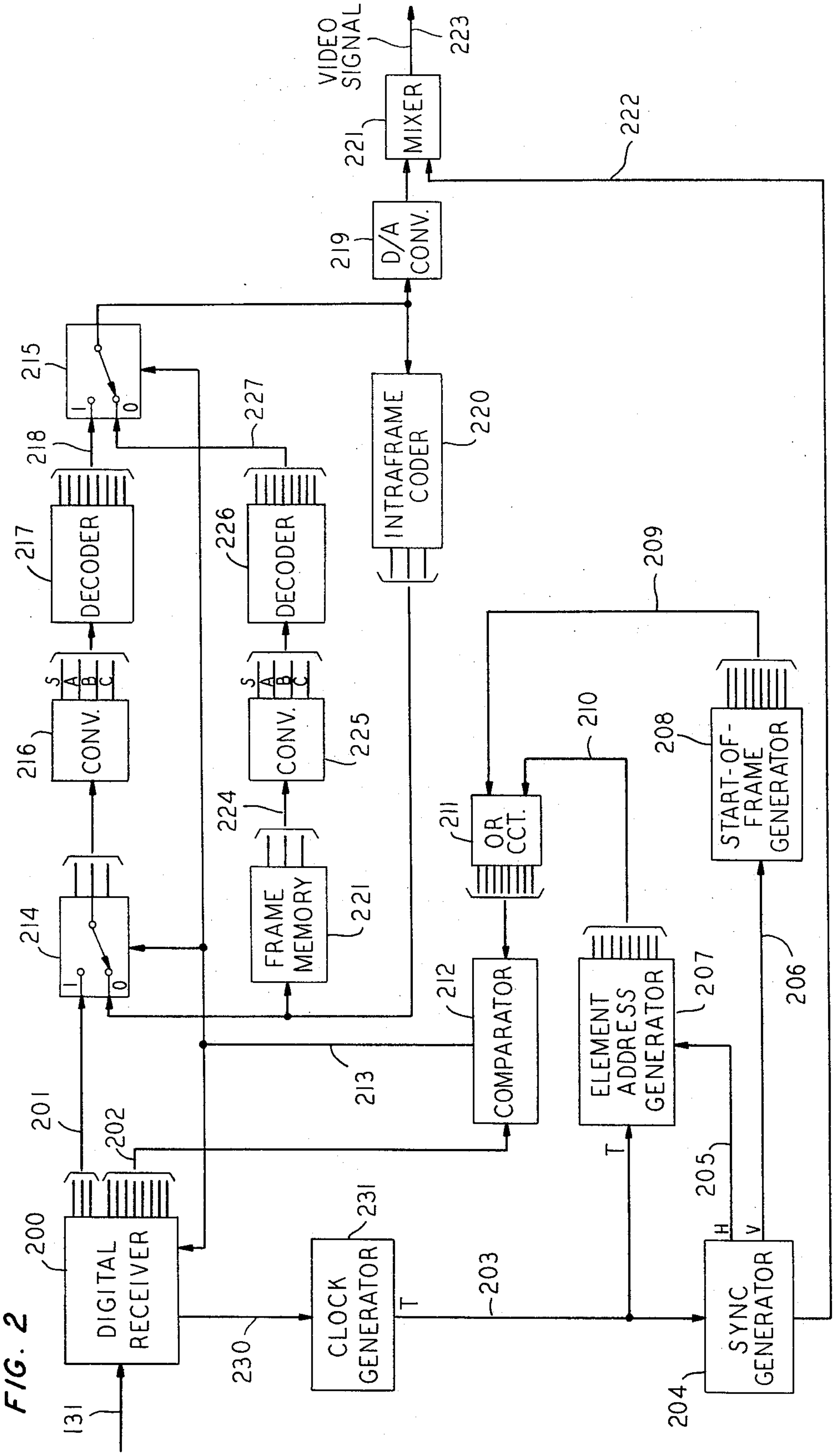
FIG. 2 is a schematic block diagram of a receiving apparatus constructed in accordance with the present invention.

In order to clearly understand the precise operation of the embodiments shown in FIGS. 1 and 2, it is helpful to consider the operation of these embodiments on a specific input video signal. In FIG. 7, a curve designated as 701 indicates the video signal amplitudes for various picture elements which were provided as an input to the encoder 101 in FIG. 1 during some previous interval. In the discussion to follow, it will be assumed that these amplitudes represented by curve 701 have already been encoded by the FIG. 1 transmitting apparatus and the necessary information has already been transmitted to the FIG. 2 receiving apparatus. In addition, it will be further assumed that the video signal amplitudes to be presented to the input of encoder 101 are represented by curve 702 in FIG. 7. As can be seen in FIG. 7, the amplitudes represented by curve 702 can easily result from a horizontal translation of the image being viewed by the video signal generating apparatus. The translation would be such that the object in the image which originally produces the amplitudes represented by curve 701 simply moved to a position in the field-of-view which is scanned earlier in the video frame.

To understand how the new video signal amplitudes of curve 702 are processed by the embodiments in FIGS. 1 and 2, it is also helpful to first consider a more detailed structure of the coding and decoding apparatus shown in FIGS. 1 and 2 simply as blocks. The intraframe coder 114 in FIG. 1 is identical to the intraframe coder 220 in FIG. 2. Each of these coders is constructed in the present embodiment in accordance with the schematic block diagram shown in FIG. 5. Each 8-bit digital word provided at the input of the coder by way of bus 501 is coupled to one input of a digital subtractor circuit 502. A second input of digital subtractor circuit 502 is presented with an 8-bit digital word out of accumulator 503. As pointed out hereinafter, the digital word provided by accumulator 503 represents by its value the amplitude of the picture element previously presented as an input on bus 501. Hence, digital subtractor circuit 502 provides a digital word at its output on bus 504 whose value corresponds to the element-to-element difference of the successive picture elements provided on bus 501.

A digital classifier 505 transforms the element-to-element difference on bus 504 into a set of logical values on the lines designated as S, A, B and C at the output of digital classifier 505. The precise nature of this transformation is set forth in FIG. 6. The scale designated as "Element-to-Element Difference" in FIG. 6 corresponds to the value of the element-to-element difference signal provided at the output of the subtractor circuit. The output from classifier 505 generated by any one of these values is set forth in the rows of FIG. 6 designated as classifier outputs. For example, if an element-to-element difference on bus 504 is greater than or equal to +4 and less than +9, an energizing signal corresponding to a logical "1" is provided on the output lines designated as S, B and C, whereas the absence of an energizing signal on line A is designated as logical "0." An element-to-element difference greater than or equal to +9 will result in energizing signals corresponding to logical "1s" on each of the output lines from classifier 505. Similarly, element-to-element differences less than or equal to −9 will result in all logical "1s" except for the sign bit, S, which is "0." For the same absolute magnitude of element-to-element difference, the logical values provided on lines A, B and C are identical for both plus and minus values. It is only the logical value for the sign bit, S, which changes.

In response to the logical values provided at the output of classifier 505, a weighter circuit 506 develops an 8-bit digital word which indicates in binary language the values set forth in FIG. 6 in the row designated as "Weighter Outputs." Accumulator 503 adds the value represented by the digital word at the output of the weighter circuit to the previously stored digital word in accumulator 503. In this way, the element-to-element difference is utilized to constantly update the digital word provided at the output of accumulator 503 so as to provide a digital word which represents the previous picture element amplitude.

The output of digital classifier 505 is also coupled to the input of a 3-bit converter 507. Converter 507 merely transforms the logical state provided at the output of classifier 505 into a 3-bit digital word. The precise 3-bit word provided by converter 507 for each of the classifier output states is set forth in the row designated as "3 BIT CONV. OUTPUT" in FIG. 6. Those skilled in the art will, at this point, readily recognize the intraframe coder as a 3-bit differential pulse code modulation apparatus.

Converter 116 in FIG. 1 and converters 216 and 225 in FIG. 2 provide an operation which is essentially the inverse of that which is provided by 3-bit converter 507. Each of the above-mentioned converters accepts a 3-bit digital word at its input and provides at its output a logical state on four lines designated as S, A, B and C. The correlation between input and output for these converters is identical to the correlation set forth in FIG. 6 for converter 507, except input and output are interchanged.

Figure 4:
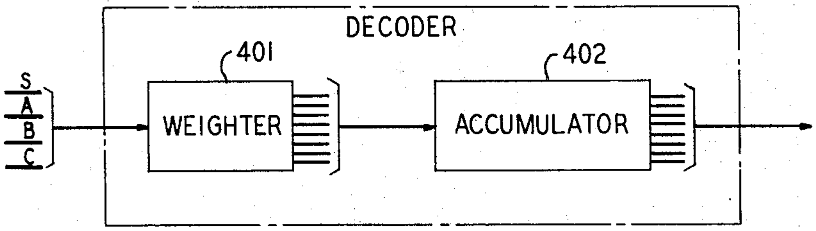

These logical states at the output of the converters 116, 216 and 225 are then coupled to the inputs of their respective decoders 110, 217 and 226. A more detailed block diagram of each of these decoders is provided in FIG. 4. Weighter circuit 401 in FIG. 4 is identical to the above-mentioned weighter circuit 506 in FIG. 5. It accepts the logical state provided by its corresponding converter apparatus and transforms that state into an 8-bit digital word which designates in binary language one of the values set forth in FIG. 6 as "Weighter Outputs." Accumulator 402 adds the value represented by the digital output from weighter 401 to the value being stored within accumulator 402. Hence, accumulator 402 is identical in its operation to accumulator 503 in FIG. 5.

Figure 3:
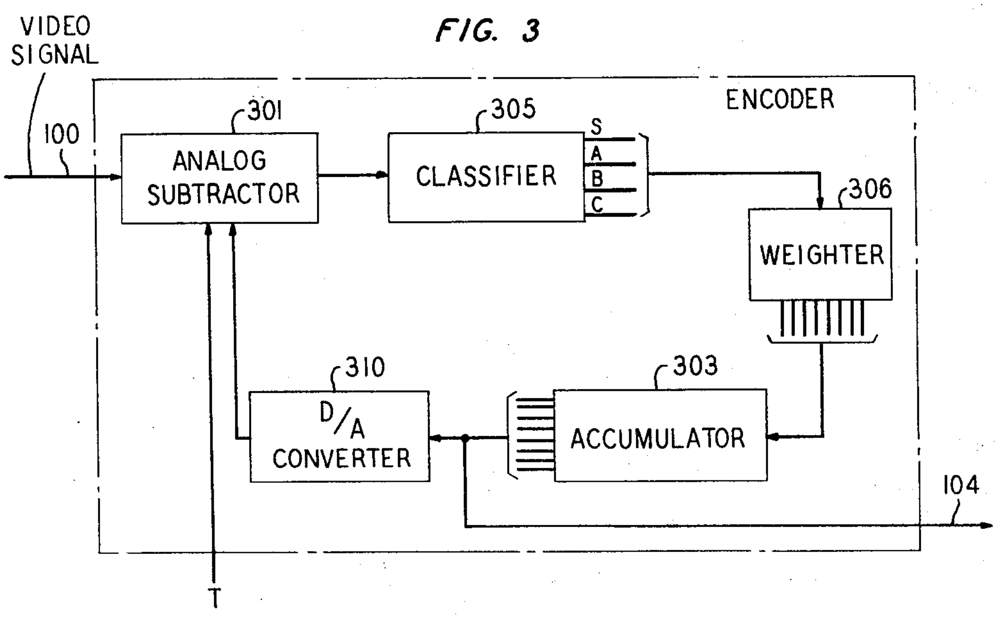
FIGS. 3, 4 and 5 are schematic block diagrams which provide more detailed disclosures of circuits disclosed as boxes within the diagrams of FIGS. 1 and 2.

The apparatus utilized to encode the analog video input signal on line 100 is set forth in FIG. 3 of the drawings. The analog video signal is coupled by way of line 100 to an input of analog subtractor circuit 301. A second input of analog subtractor circuit 301 is presented with the output of a digital-to-analog converter 310. In response to each energizing pulse out of clock circuit 103, analog subtractor circuit 301 provides an analog sample to the input of classifier 305. Classifier 305 develops a logical state on each of its output lines which represents, by its value, the amplitude of the sample provided at its input. The logical state developed for each of the analog values is here again provided in FIG. 6 by the scale designated as "ELEMENT-TO-ELEMENT DIFFERENCE" and the rows designated as "Classifier Outputs." Classifier 305 is similar in its operation to the digital classifier 505 except that classifier 305 operates on an analog sample at its input rather than on a digital signal.

Weighter circuit 306 is identical in its operation to weighter circuit 506, and accumulator 303 is identical in its operation to accumulator 503. The digital word developed at the output of accumulator 303 is coupled to the input of the digital-to-analog converter 310. The output of accumulator 303 is also coupled to bus 104 in order to provide an 8-bit digital word to the input of digital subtractor circuit 106 in FIG. 1.

As pointed out previously, many other forms of encoders may be utilized to provide the function provided herein by encoder apparatus 101. It is advantageous, however, if the encoder quantizes to the same levels as those which are provided within the intraframe coder. As indicated hereinabove, the video signal provided on line 100 may also have been previously encoded in an element-to-element difference format. In this case, an encoder 101 apparatus may be constructed of a converter like converter 116 in tandem with a decoder apparatus of the type shown in FIG. 4.

The video signal represented by curve 701 in FIG. 7 is encoded by encoder 101 into the discrete levels represented by curve 801 in FIG. 8. Because of the nature of the encoding apparatus, the steps which occur in curve 801 can only assume the values designated as weighter outputs in FIG. 6. As pointed out hereinabove, it will be assumed that these amplitudes represented by curve 801 have already been processed by the embodiments shown in FIGS. 1 and 2. Therefore, the element-to-element differences occurring in curve 801 have already been stored within frame memory 115 in FIG. 1 and also within frame memory 221 in FIG. 2. As will be apparent hereinafter, these frame memories are caused to track, that is, to maintain the same element-to-element difference values.

The element-to-element difference values of curve 801 are set forth in FIG. 9 in the column designated as "Frame Memory 115 Output." The left-hand column in FIG. 9 designates the picture element numbers corresponding to those given in the abscissas shown in FIGS. 7 and 8. The element-to-element difference associated with each of these picture elements corresponds to the difference in amplitude between that picture element and the quantized value representing the previous picture element. Hence, it is the difference which must be added to the previous picture element's amplitude in order to obtain the amplitude of its corresponding picture element. For example, the element-to-element difference of −12 for picture element 11 in FIG. 9 corresponds to the −12 step in curve 801 at the point on the abscissa designated as number 11. These element-to-element differences are coupled out of frame memory 115 into decoder 110 by way of converter circuit 116. In response to each of these element-to-element differences, decoder 110 produces an 8-bit digital word on bus 111 having the value given in the column of FIG. 9 designated as "Decoder 110 Output."

The encoded values of the new video signal represented by curve 702 in FIG. 7 are given in curve 802 of FIG. 8 and in the column designated as "Encoder 101 Output" in FIG. 9. These values correspond to the values which are developed at the output of accumulator 303 within encoder 101. As pointed out hereinabove, the new digital word on bus 104 and the digital word from decoder 110 are both coupled to the inputs of a digital subtractor circuit 106. For the operation illustrated in FIG. 9, threshold detector 107 required a difference having an absolute magnitude of at least five before that detector developed an energizing signal on line 108. Accordingly, those picture elements in FIG. 9 which have a difference between the new value from encoder 101 and the decoder output that equals or exceeds five, are indicated as having a logical "1" output from the threshold detector 107. As shown in FIG. 9, all of the picture elements between and including numbers 4 through 19, except for number 12, result in an energizing signal on line 108.

For the picture elements which do not result in producing an energizing signal on line 108, the decoder 110 output is coupled by way of gate 113 to the input of intraframe coder 114. These values produce element-to-element difference values at the output of intraframe coder 114 identical to the previously stored values. When, however, an energizing signal is produced on line 108, the new digital word from encoder 101 rather than the digital word from decoder 110 is coupled by way of gate 113 to the input of intraframe coder 114. Each of the digital words coupled to the input of intraframe coder 114 is caused to produce an 8-bit digital word at the output of accumulator 503 in FIG. 5. The value which results at the output of accumulator 503 from each of the digital words coupled into intraframe coder 114 is presented in the column designated as "Accumulator 503 Output" in FIG. 9. The value developed for each of the picture elements is the value which is used to establish the element-to-element difference when the next digital word is coupled to the input of coder 114. For example, during picture element number 4, when a new value of 44 is coupled by way of gate 113 to the input of coder 114, the value of 50 is presented by accumulator 503 to one input of the digital subtractor circuit 502 in coder 114. The difference between these two values results in the generation of an element-to-element difference of −6 for picture element number 4 at the output of coder 114. This element-to-element difference is coupled to the input of frame memory 115 and is also coupled by way of gate 118 to digital transmitter 119.

The generation of new element-to-element differences continues for picture elements 4 through 11, as shown in FIG. 9. Picture element 12 does not result in the generation of a logical "1" state on line 108. Accordingly, the value of 14 from decoder 110 output is coupled through to intraframe coder 114. As a result, an element-to-element difference of +6 is generated by coder 114. Although this element-to-element difference is coupled to the input of frame memory 115, it is not coupled by way of gate 118 to the digital transmitter 119. It should be noted, however, that the element-to-element difference value for picture element 12 is changed from a value of −12 to a value of +6 even though that picture element has not resulted in the transmission of an element-to-element difference to the receiving location.

Picture element 13 again resumes the coupling of the encoder 101 output through to the input of coder 114. The differences between the encoder 101 output and the accumulator output within coder 114 result in the generation of the element-to-element differences shown for picture elements 13 through 19 in FIG. 9. For picture element 20, the element-to-element difference generated by coder 114 is produced by taking the difference between decoder 110 output and the value stored in accumulator 503 within coder 114. For the remainder of the picture elements, this type of difference continues to generate element-to-element differences identical to those which were previously stored within frame memory 115. As shown in FIG. 9, these latter element-to-element differences do not, however, result in the transmission of any information to the receiving apparatus.

The element-to-element differences set forth in the column designated as "Transmitted Value" in FIG. 9 are coupled by way of transmission channel 131 to the receiving apparatus shown in FIG. 2. These element-to-element differences are set forth next to their corresponding picture element numbers in a column designated as "Received Values" in FIG. 10. Each of the element-to-element differences received on transmission channel 131 is, of course, stored in a buffer memory within digital receiver 200 until its corresponding address is present at the output of OR circuit 211. At that time an energizing signal on line 213 couples the element-to-element difference out of receiver 200 and into gate 214 by way of bus 201. The element-to-element difference value present at the output of frame memory 221 during each instant when the address corresponding to a particular picture element number is present at the output of OR circuit 211 is presented for each of the picture element numbers in a column designated as "Frame Memory 221 Output" in FIG. 10. The values set forth in this column are identical to the values set forth in the column designated as "Frame Memory 115 Output" in FIG. 9. As pointed out hereinabove, the apparatus of FIGS. 1 and 2 cause these memories to track, that is, to maintain the same element-to-element difference value for each of the picture elements within the video frame. As a result, only the element-to-element difference values which correspond to significant changes must be transmitted from the transmitting location to the receiving location.

The element-to-element difference values present at the output of frame memory 221 cause decoder 226 to generate the absolute amplitude values set forth in the column designated as "Decoder 226 Output" in FIG. 10. These values continue to be generated, of course, even though the output of decoder 226 may not be connected through gate 215.

For the first three picture elements set forth in FIG. 10, no element-to-element difference value is received from the transmitting location. During these picture elements, the amplitude values out of decoder 226 are coupled by way of gate 215 to the input of intraframe coder 220. As a result, coder 220 generates element-to-element difference values during these picture elements which are identical to those values previously stored within frame memory 221. Since gate 214 is not operated during these picture elements, the same element-to-element difference values are also coupled to the input of decoder 217, thereby causing this decoder to generate amplitude values which are identical to those at the output of decoder 226. These facts are set forth in the appropriate columns shown in FIG. 10.

During the instant when the address for picture element number 4 is present at the output of OR circuit 211, the element-to-element difference value of −6 is coupled through gate 214 and converter 216 into decoder 217, thereby causing the output of that decoder to drop to a value of 44. This value of 44 is then coupled through gate 215 to the input of coder 220. As indicated in FIG. 10, the value of 50 was previously presented to the coder 220 input and, therefore, this value appears at the output of the accumulator within coder 220. When the value of 44 is coupled to the input of coder 220, an element-to-element difference value of −6 is developed at its output.

During picture elements numbered 4 through 11, the amplitude values generated at the output of decoder 217 by the action of the new element-to-element difference values from bus 201 are coupled to the input of coder 220, resulting in the generation of the element-to-element difference values set forth in FIG. 10 in the column designated as "Coder 220 Output." As shown in FIG. 10, no element-to-element difference value is received from the transmitter for picture element 12. Therefore, during this picture element the amplitude value of 14 is coupled from decoder 226 through gate 215 to the input of coder 220. This value of 14 when compared with the previously established amplitude of 10 within coder 220 causes the generation of an element-to-element difference value of +6 at the output of coder 220. This element-to-element difference value of +6 is inserted into frame memory 221 for picture element 12, thereby changing the value of the element-to-element difference for that picture element number even though no element-to-element difference was received for that picture element from the transmitting location. During picture element number 13, the output of decoder 217 is again coupled through gate 215 to the input of coder 220, and the element-to-element difference values which result during picture element numbers 13 through 19 are those which are set forth in FIG. 10.

Finally, from picture element number 20 on, the output from decoder 226 is coupled through gate 215 to the input of coder 220 and the resulting element-to-element difference values continue to be coupled to the input of memory 221 and to the input of decoder 217.

The final values of element-to-element differences which are stored within memory 221 for this entire picture element sequence are set forth in the column designated as "Coder 220 Output" in FIG. 10. It should be noted that these values are identical to the values being stored within the FIG. 1 transmitter's frame memory 115 after the same sequence of picture elements. These latter values are, of course, set forth in the column designated as "Intraframe Coder 114 Output" in FIG. 9. As pointed out hereinabove, the same identical value is present within both of the frame memories for each of the picture elements. This fact continues to remain true even though some of the values for picture elements that have not been transmitted may be changed in both the transmitting and receiving locations. As a result, a video image that is generated from the stored element-to-element values in the receiving location always corresponds to the video image which is stored in the form of element-to-element values at the transmitting location.

What has been described hereinabove is a specific illustrative embodiment of the present invention. Numerous departures therefrom may, of course, be made by those skilled in the art without departing from the spirit and scope of the present invention.

We claim:

1. Redundancy reduction transmitting apparatus for use with input signal samples having intervals called frames comprising a coding means for producing an encoded word at its output in response to samples provided at its input, means for generating address words each of which indicates the location of a corresponding encoded word in a frame interval, memory means for storing an entire frame of encoded words, a decoder for translating encoded words from said memory means into amplitude values, means for comparing the amplitude values at the output of said decoder means with said input signal samples, switching means responsive to said comparison means for selectively coupling either said amplitude values at the output of said decoder means or said input signal samples to the input of said coding means, and gating means responsive to said comparison means for coupling an encoded word at the output of said coding means and its corresponding address word to a transmission medium.

2. Apparatus as defined in claim 1 wherein said coding means includes a subtractor circuit having an output and two inputs one of which is connected to receive the sample provided at the input of said coding means, an accumulator means having its output connected to the other of said two inputs, and means for coupling the output of said subtractor circuit to said accumulator means.

3. Apparatus as defined in claim 2 wherein said decoder includes an accumulator means substantially identical to said accumulator means in said coding means.

4. Redundancy reduction transmitting apparatus for use with video signal samples having frame intervals comprising an intraframe coder for generating an element-to-element difference signal at its output in response to at least two successive samples at its input, a memory means for storing an entire frame interval of element-to-element difference signals, a decoder for converting the element-to-element difference signals out of said memory means into picture element amplitude values, means for comparing a picture element amplitude value at the output of said decoder with an input video signal sample having the same location within the frame interval, means responsive to said comparing means for selectively coupling either the amplitude value from said decoder or said input video signal sample to the input of said intraframe coder, and gating means responsive to said comparing means for coupling the element-to-element difference signal at the output of said intraframe coder to a transmission medium.

5. Apparatus as defined in claim 4 wherein said intraframe coder includes a digital subtractor circuit having one input coupled to receive a sample at the input of said coder, an accumulator means having its output connected to a second input of said digital subtractor, and means for coupling the output of said digital subtractor to an input of said accumulator means.

6. Apparatus as defined in claim 5 wherein said decoder has an accumulator means substantially identical to the accumulator means in said intraframe coder.

7. Redundancy reduction receiving apparatus for processing a received encoded word having a particular location within a frame interval comprising memory means for storing an entire frame of encoded words, means for generating address words which indicate by their values the locations of corresponding encoded words in a frame interval, a first decoder means for converting an encoder word read out of said memory means into an amplitude value, coding means for converting an amplitude value at its input into an encoded word at its output, means for coupling an encoded word from said coding means into said memory means, a second decoder means for converting an encoded word at its input into an amplitude value at its output, means responsive to said address generating means for generating an energizing signal when an address word from said address generating means is identical to the particular location of said received encoded word, and a switching means responsive to said energizing signal for selectively coupling either an encoded word from said coding means or said received encoded word into said second decoder means and for selectively coupling an amplitude value either from said first decoder means or from said second decoder means into said coding means.

8. Apparatus as defined in claim 7 wherein said coding means includes a subtractor circuit having an output and two inputs one of which is connected to receive the sample provided at the input of said coding means, an accumulator means having its output connected to the other of said two inputs, and means for coupling the output of said subtractor circuit to an input of said accumulator means.

9. Apparatus as defined in claim 8 wherein said first and second decoder means each includes an accumulator means substantially identical to said accumulator means in said coding means.

10. Redundancy reduction receiving apparatus for use with input element-to-element difference signals having particular locations in a video frame interval comprising an intraframe coder for developing an element-to-element difference signal in response to at least two successive amplitude samples at its input, a memory means for storing an entire frame interval of element-to-element difference signals, a first decoder for converting element-to-element difference signals out of said frame memory into picture element amplitude values, a second decoder for converting an element-to-element difference signal at its input into an amplitude value at its output, means for generating address words each one of which indicates a particular location in said frame interval, means for generating an energizing signal when the generated address word corresponds to the same location as an input element-to-element difference signal, first switching means responsive to said energizing signal for selectively coupling either an input element-to-element difference signal or the element-to-element difference signal at the output of said intraframe coder into said second decoder, and a second switching means responsive to said energizing signal for selectively coupling either the amplitude value at the output of said first decoder or the amplitude value at the output of said second decoder to the input of said intraframe coder.

11. Apparatus as defined in claim 10 wherein said intraframe coder includes a subtractor circuit having an output and two inputs one of which is connected to receive the sample provided at the input of said intraframe coder, an accumulator means having its output connected to the other of said two inputs, and means for coupling the output of said subtractor circuit to an input of said accumulator means.

12. Apparatus as defined in claim 11 wherein said first and second decoders each include an accumulator means substantially identical to said accumulator means in said intraframe coder.

* * * * *